United States Patent [19]
Shepherd

[11] 3,770,300
[45] Nov. 6, 1973

[54] AUTOMATIC SAFETY COUPLING DEVICE
[76] Inventor: Roy Earl Shepherd, 623 Rathgar Ave, Winnipeg, Manitoba, Canada
[22] Filed: Oct. 13, 1971
[21] Appl. No.: 188,759

[52] U.S. Cl. ............................................. 280/511
[51] Int. Cl. ............................................. B60d 1/06
[58] Field of Search ................... 280/508, 504, 509, 280/510, 511, 513

[56] References Cited
UNITED STATES PATENTS
| | | | |
|---|---|---|---|
| 3,495,851 | 2/1970 | July | 280/510 |
| 3,161,422 | 12/1964 | Wade | 280/508 |
| 2,478,736 | 8/1949 | Balzer | 280/508 |
| 1,335,211 | 3/1920 | Walker | 280/508 |

Primary Examiner—Kenneth H. Betts
Assistant Examiner—Robert R. Song
Attorney—Kent & Ade

[57] ABSTRACT

A drafthead carries a link pin vertically situated therein and held in the uppermost position by a paul. As a ball on a towing vehicle enters the drafthead, it disengages the paul and allows the link pin to drop over the ball by gravity. A guiding cone may be incorporated to assist in the engaging action which can occur at a variety of angular positions.

12 Claims, 7 Drawing Figures

PATENTED NOV 6 1973

INVENTOR.
ROY EARL SHEPHERD
BY

PATENTED NOV 6 1973 3,770,300

INVENTOR.
Roy Earl Shepherd
BY

AUTOMATIC SAFETY COUPLING DEVICE

BACKGROUND OF THE INVENTION

Normally coupling units between a towed vehicle and a trailer unit are either hand operated or require extremely accurate maneuvering before they can be engaged one with the other. Not only is this a difficult maneuver but safety factors are involved particularly with respect to heavy duty commercial vehicles and although the present device is designed for these vehicles, nevertheless it can be utilized for commercial, industrial and domestic vehicles requiring the coupling units for connection therebetween.

SUMMARY OF THE INVENTION

This invention relates to new and useful improvements in automatic safety coupling devices for tractors, trailers and the like.

The object of the invention is the elimination of hand operated coupling units and therefore eliminating most of the danger in using said hand operated coupling units.

Also this invention enables the operator to engage and disengage the coupling unit more quickly and efficiently than the hand operated units.

Furthermore, this automatic safety coupling device is economically manufactured, and well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF THE DRAWINGS

In the drawings like characters of reference indicate corresponding parts in the different figures.

Figure 6:
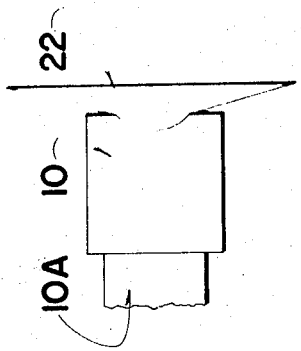
FIG. 6 is a side elevation, reduced in scale, of the socket portion of the coupling showing the preferred embodiment.
Figure 7:
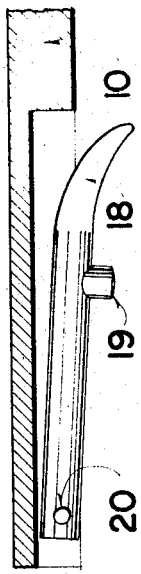
FIG. 7 is a fragmentary cross sectional view of part of the draughthead showing the mounting of the pawl.
Figure 3:
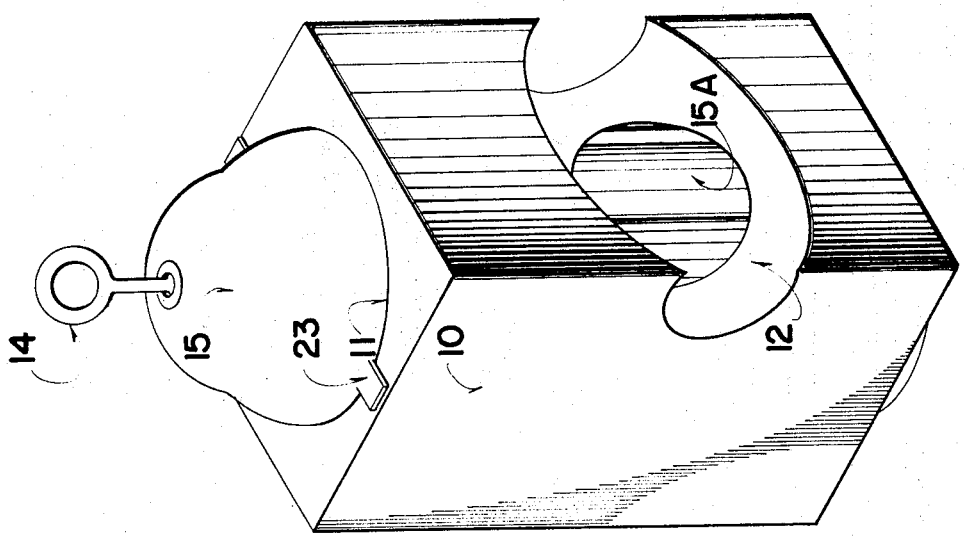
FIG. 3 is an isometric view of the coupling draughthead with the link pin inserted.

Proceeding therefore to describe the invention in detail, the coupling draughthead 10 is a rectangular block of metal with a cylindrical shaft opening 11 formed through the centre. This is secured in the conventional manner to the tractor or towed vehicle by attachment member 10A (FIG. 6).

Approximately half way down the block 10 there is an aperture 12 in the front extending around the sides of the draughthead towards the rear. This aperture 12 opens into the link pin or shaft aperture 11 which extends vertically clear through the draughthead. At the rear of the link pin aperture 11 and adjacent the base of same there is a recess in the draughthead 10 for a link pin pawl 13.

Figure 2:
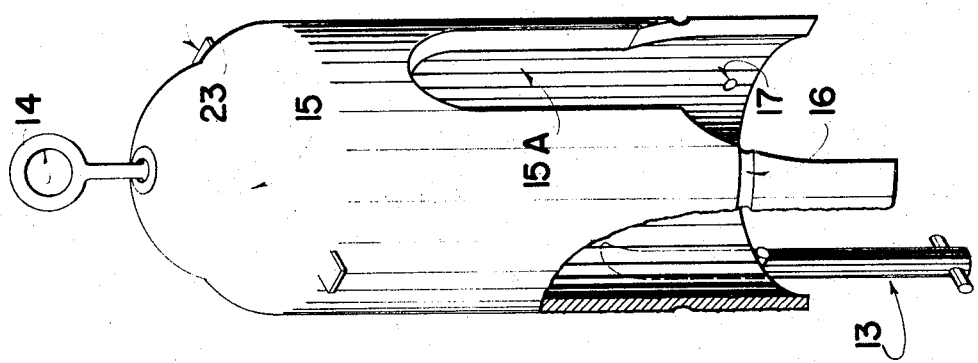
FIG. 2 is a front view of the link pin.

The link pin 15 is basically cylindrical in shape but only open at one end and part of its face as in FIG. 2. The upper part 15A of this opening is shaped to engage over the ball 21. At the top of the link pin there is an eye 14 used to lift the pin 15 manually into a position ready to accept the universal ball 21 which extends horizontally from the tow vehicle. Adjacent the bottom end of the link pin 15 is an annular pawl insert groove 16 which is formed in the outer surface of the link pin 15. Also there are cotter key apertures 17 for the safe holding of the link pin 15 in a downward position as will hereinafter be described.

Figure 4:
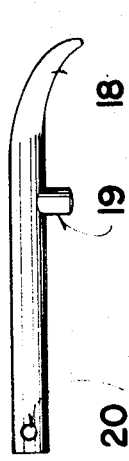
FIG. 4 is a side view of the link pin pawl.
Figure 5:
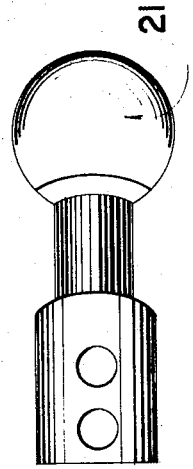
FIG. 5 is a side view of a universal ball.

The link pin pawl 18 in FIG. 4 is held in place at the lower end by a pivot 20 in the recess in the draughthead. Approximately intermediate the ends of the link pin pawl 18 is a striker tappet 19 which protrudes towards the universal ball aperture 12 in the coupling draughthead 10. The upper end is hooked inwardly to facilitate detachable engagement within the annular groove 16.

The link pin 15 is inserted into the link pin aperture 11 by holding the link pin eye 14. It is lowered until it is engaged by the link pin pawl 18 in the pawl insert groove 16 and held in place by same.

The universal ball is inserted in the universal ball aperture 12 at any angle through approximately 90° by backing the tow vehicle in the usual manner. As the ball enters aperture 12 it comes into contact with the striker tappet 19 on the link pin pawl 18 driving it backwards and disengaging same from the pawl insert groove 16 allowing the link pin 15 to drop by gravity, over the ball 21 and maintains the coupling in a closed position.

A cotter pin (not illustrated) is then inserted in the cotter key apertures 17 in the link pin 15 to safely hold the link pin 15 in permanent downward position, it being understood that the lower end of the link pin 15 extended below the lower side of the draughthead 10. To disengage the coupling, the cotter pin is removed from the cotter key apertures 17 and the link pin 15 is raised by the link pin eye 14 until the link pin pawl 18 engages with the pawl insert groove 16 to hold the link pin 15 in an upward position. The universal ball 21 is then withdrawn by driving the tow vehicle forward.

Figure 1:
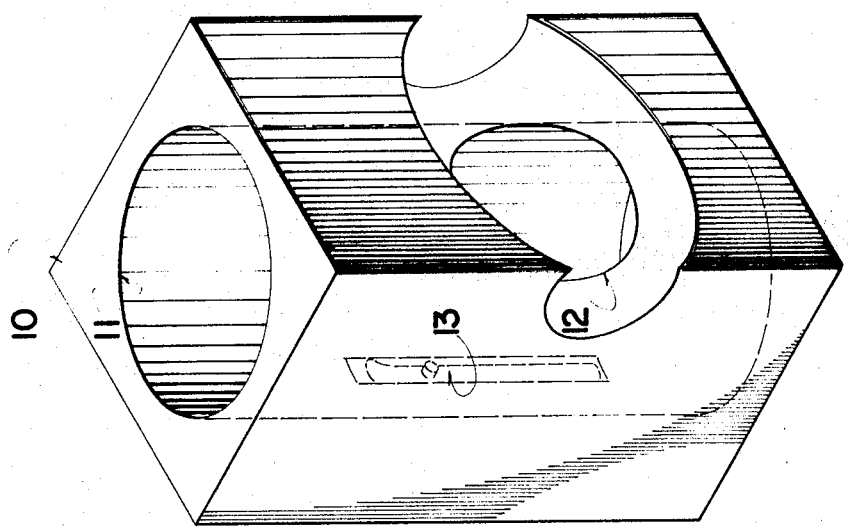
FIG. 1 is an isometric view of the coupling draughthead.

With normal hitches, the towing unit hitch has to be aligned exactly with the coupling on the trailer before engagement can take place and this is a relatively difficult manoeuver. With the present device the two can be engaged in any position through an angle of approximately 90° thus facilitating the hitching process. This action is further enhanced by the provision of guiding cone 22 shown in phantom in FIG. 1 and in side elevation in FIG. 6. This cone is secured around the boundary of the aperture 12 and as the ball 21 moves towards the draughthead 10, it is guided into engagement with the draughthead by the cone 22.

Notice should be taken of a small flange 23 situated adjacent the upper end of link pin 15. This permits the link pin to be lowered and disengaged from the link pin pawl 13 when the device is not in use. Under these circumstances the cotter pin (not illustrated) could be engaged within the flanged apertures 17 thus preventing the link pin from becoming displaced due to rough terrain or the like.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

What I claim as my invention is:

1. A coupling device for drive vehicles and trailer vehicles and the like in conjunction with a universal ball secured to one of said vehicles; said device comprising in combination a draughthead secured to the other of said vehicles, said draughthead including a front wall and side walls and being vertically apertured, a ball receiving aperture in the front and side walls of said draughthead opening out into the vertical aperture therein, a link pin slidably engageable in said vertical aperture between and an uppermost ball receiving position and a lowermost ball holding position, and a pawl pivotally secured by one end thereof in the wall of the said vertical aperture, an upper end on said pawl releasably engaging means on said link pin to hold same in the uppermost position, said link pin including a cylindrical member, manual lifting means on the upper end thereof and a ball receiving aperture in one wall thereof aligned with the ball receiving opening in said draughthead when in the said uppermost position.

2. The device according to claim 1 in which said means on said link pin includes an annular groove around the outer surface thereof adjacent the lower end thereof to receive said upper end of said pawl when said link pin is in the uppermost position.

3. The device according to claim 2 in which the upper end of said pawl is provided with a hook extending inwardly to facilitate engagement thereof within said annular groove.

4. The device according to claim 3 in which said pawl includes a striking tappet intermediate the ends thereof and situated below the lower edge of said link pin when in the said uppermost position, said tappet extending into the vertical aperture in the area of coincidence with said ball receiving aperture in said draughthead whereby said ball will strike same when said ball enters said ball receiving aperture.

5. The device according to claim 4 which includes a guiding cone secured to the edges of said ball receiving aperture in said draughthead and extending outwardly therefrom, for assisting in guiding said ball into said ball receiving aperture.

6. The device according to claim 3 which includes a guiding cone secured to the edges of said ball receiving aperture in said draughthead and extending outwardly therefrom, for assisting in guiding said ball into said ball receiving aperture.

7. The device according to claim 2 in which said pawl includes a striking tappet intermediate the ends thereof and situated below the lower edge of said link pin when in the said uppermost position, said tappet extending into the vertical aperture in the area of coincidence with said ball receiving aperture in said draughthead whereby said ball will strike same when said ball enters said ball receiving aperture.

8. The device according to claim 7 which includes a guiding cone secured to the edges of said ball receiving aperture in said draughthead and extending outwardly therefrom, for assisting in guiding said ball into said ball receiving aperture.

9. The device according to claim 2 which includes a guiding cone secured to the edges of said ball receiving aperture in said draughthead and extending outwardly therefrom, for assisting in guiding said ball into said ball receiving aperture.

10. The device according to claim 1 in which said pawl includes a striking tappet intermediate the ends thereof and situated below the lower edge of said link pin when in the said uppermost position, said tappet extending into the vertical aperture in the area of coincidence with said ball receiving aperture in said draughthead whereby said ball will strike same when said ball enters said ball receiving aperture.

11. The device according to claim 10 which includes a guiding cone secured to the edges of said ball receiving aperture in said draughthead and extending outwardly therefrom, for assisting in guiding said ball into said ball receiving aperture.

12. The device according to claim 1 which includes a guiding cone secured to the edges of said ball receiving aperture in said draughthead and extending outwardly therefrom, for assisting in guiding said ball into said ball receiving aperture.

* * * * *